United States Patent [19]

Takeda

[11] 3,890,035
[45] June 17, 1975

[54] COMPLEX LIGHT SPATIAL MODULATOR

[75] Inventor: Yasutsugu Takeda, Kokubunji, Japan

[73] Assignee: Hitachi, Ltd., Japan

[22] Filed: Sept. 15, 1972

[21] Appl. No.: 289,263

[30] Foreign Application Priority Data
Sept. 17, 1971 Japan............................. 46-71806

[52] U.S. Cl............... 350/150; 350/3.5; 350/160 R
[51] Int. Cl. ............................................. G02f 1/26
[58] Field of Search............................. 350/150, 3.5

[56] References Cited
UNITED STATES PATENTS

| 3,674,332 | 7/1972 | Kogelnik | 350/3.5 |
| 3,675,220 | 7/1972 | Snaper et al. | 350/150 UX |
| 3,680,060 | 7/1972 | Keneman et al. | 350/150 UX |
| 3,684,351 | 8/1972 | Kumada | 350/150 |
| 3,692,380 | 9/1972 | Inagaki | 350/150 UX |
| 3,700,902 | 10/1972 | Buchan | 350/150 X |

Primary Examiner—John K. Corbin
Attorney, Agent, or Firm—Craig & Antonelli

[57] ABSTRACT

A light spatial modulator typically used with computer holography for modulating incident laser light with respect to two factors of three characteristic factors of a light wave, that is, the amplitude, the phase and the direction of polarization, said modulator consisting of two component modulator means tandemly disposed with respect to the incident light, each for one factor of the light wave to be modulated and each component modulator means including a plate of ferroelectric crystal such as gadolinium molybdate, the polarization of which is changed by application of a voltage.

5 Claims, 9 Drawing Figures

FIG. 1
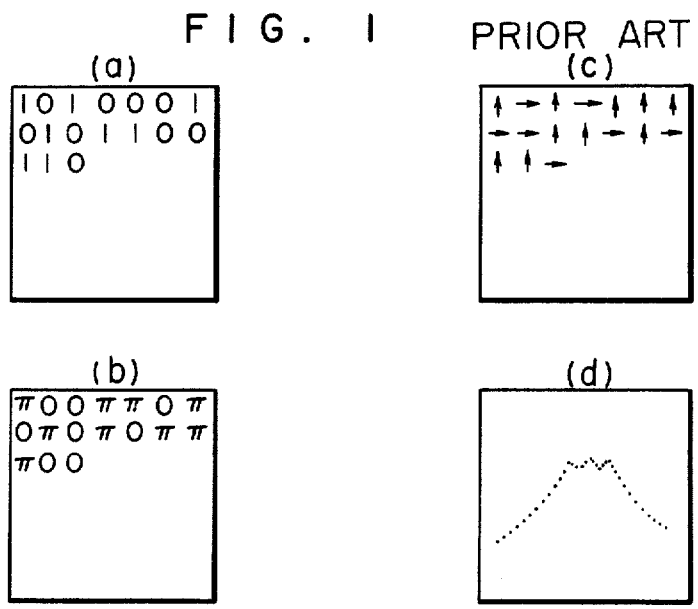
FIG. 2a PRIOR ART
FIG. 2b PRIOR ART
FIG. 3 PRIOR ART
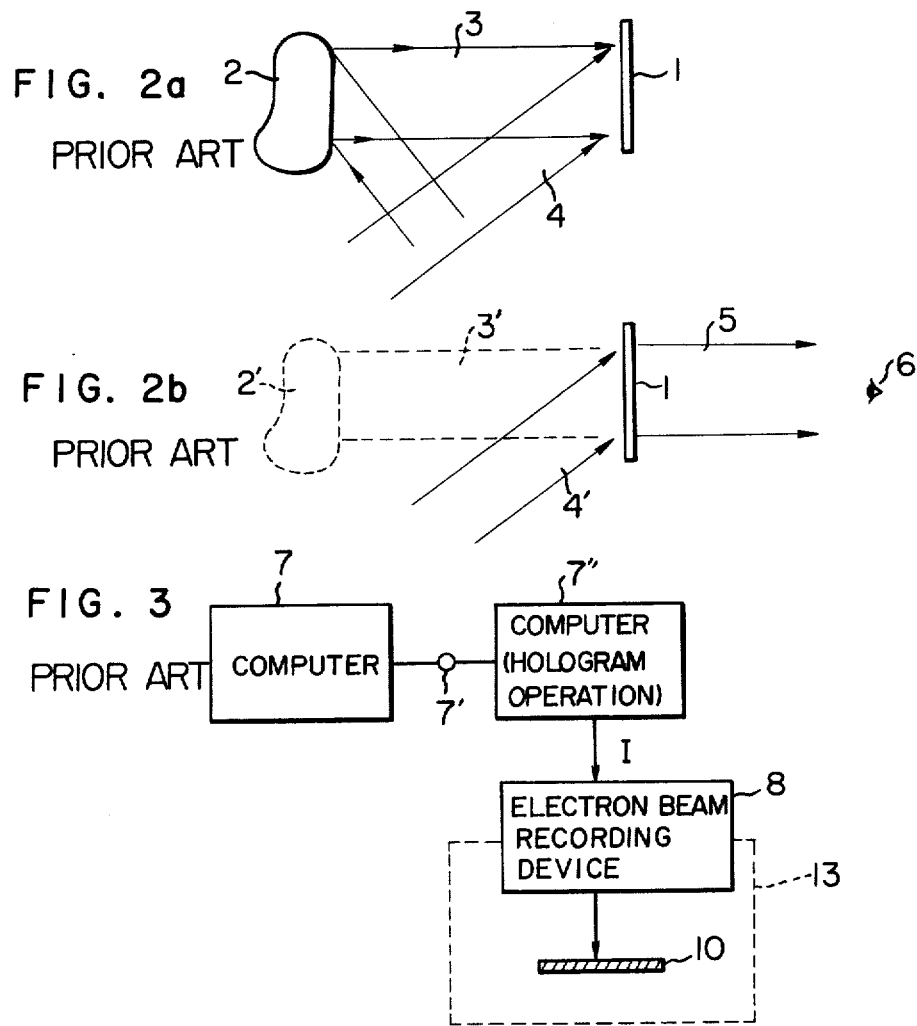

COMPLEX LIGHT SPATIAL MODULATOR

BACKGROUND OF THE INVENTION

1. Field of the Invention

This invention relates to a light spatial modulator for controlling incident light as regards at least two factors out of the amplitude, the phase and the direction of polarization independently from each other, particularly to such a modulator suitable for use with computer holography.

2. Description of the Prior Art

The known light spatial modulator can deal with only either one of various factors indicating the character of light such as the amplitude, phase and the direction of polarization, the relevant one of the factors being modulated in a two-dimensional plane to thereby produce the required information. However, such a known light spatial modulator which is only capable of modulating a single factor has not been satisfactory for display or recording of information patterns, especially in the production of computer holograms which are explained hereinafter.

SUMMARY OF THE INVENTION

The main object of this invention is to provide a light spatial modulator which imparts a complex number of modulations (for example, modulations as regards the amplitude and the phase) to light incident thereto in a two-dimentional plane.

In order to achieve the above-mentioned object, the complex light spatial modulator of this invention comprises two modulator means for respectively modulating an incident light wave as regards a different one of three factors of the amplitude, the phase and the direction of polarization according to given three-dimensional information, said two modulator means being tandemly disposed with respect to the incident light.

BRIEF DESCRIPTION OF THE DRAWING

FIG. 1 schematically shows examples of a light information pattern formed by known light spatial modulators.

FIGS. 2a and 2b are diagrams respectively illustrating the principle of recording and reproduction of three-dimensional information by the conventional technique of holography.

FIG. 3 is a block diagram of a conventional apparatus for recording a three-dimensional information derived from an electronic computer into a hologram.

DESCRIPTION OF THE PREFERRED EMBODIMENTS

Figure 4:
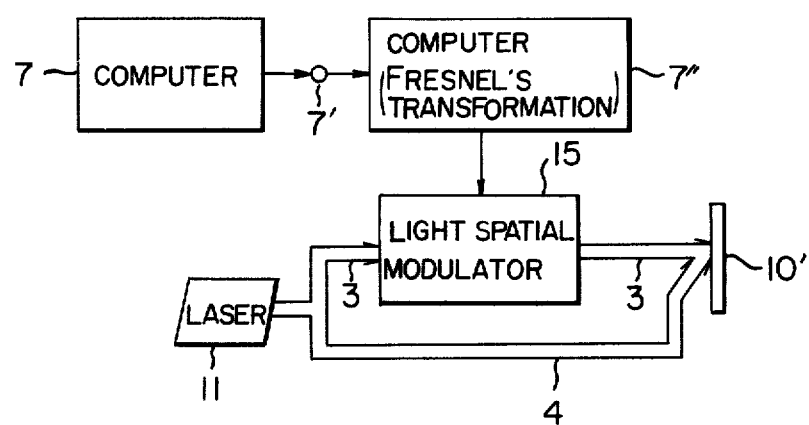
FIG. 4 is a block diagram of a computerized hologram producing system utilizing the complex light spatial modulator of this invention.

Modulation of light by the conventional light spatial modulator concerns only either one of various factors indicating the character of light such as the amplitude, the phase and the direction of polarization, the light being modulated as regards the relevant single factor in a two-dimensional plane to thereby convey the given information. In FIG. 1 which shows examples of information patterns formed using the conventional light spatial modulator, pattern (a) is constituted of an array of 1 states and 0 states produced by the amplitude modulation, 1 representing a transparent domain and 0 an opaque domain. Pattern (b) is formed by the phase modulation, indicating that the phase of transmitted light at a domain indicated by $\pi$ is different by $\pi$ radians from that at a 0 domain. Pattern (c) is formed by modulating the direction of polarization, arrow indicating that the direction of the linear polarization of light transmitted through the relevant domain is vertical while arrow indicates that said direction is horizontal. Finally, pattern (d) is an analog pattern presented as a figure, the density of the information being sufficiently high for such a presentation.

The conventional light spatial modulator is used for making electronic computer holograms. Electronic computer holography is a technique for making a hologram of certain information by the medium of an electronic computer. For example, in the hologram recording of an image of a three-dimensional object by laser holography, the physical process of the recording is analyzed by an electronic computer, and the obtained results are used for driving an electron beam recording device to product the hologram on a recording medium such as a photographic film. Prior to explaining the computer holography, the principle of the laser holography, that will be an optical measure for producing a hologram is briefly explained in the following paragraph.

FIG. 2a shows the principle of producing a hologram of three-dimensional information by means of laser holography, while FIG. 2b illustrates reproduction of the three-dimensional information from such a hologram. Referring to FIG. 2a, a three-dimensional object 2 is irradiated with laser light and the reflected light 3 is projected on a sheet of photo-sensitive material 1. A second laser light 4, which is coherent to the first laser light and which is referred to as reference light, is also projected on the sheet 1 so that the reflected light 3 and the second laser light 4 interfere with each other to thereby produce an interference pattern on the photo-sensitive sheet 1. Thus, a hologram is obtained. The sheet 1 may be made of one of various photo-sensitive materials such as a dry plate of a high resolution, photo-resist and chrome-gelatin. Referring to FIG. 2b, sheet 1 on which the hologram has been recorded is irradiated with laser light 4' which is the same as the reference light 4 and which is referred to as reproduction light. This laser light passing through the sheet produces a differented wave 5, which visualizes, in a virtual image as indicated by reference numeral 2', the three-dimensional object 2 for an eye 6.

Referring to FIG. 3 which shows a block diagram of a conventional system of computer holography, the principle of recording in the conventional computer holography is explained hereunder in comparison with the recording in the above-described optical holography. It will be noted that the information recorded on the light recording medium, that is sheet 1, is a superimposition of the reference light on the Fresnel's transformation (which will be explained hereinafter) at the surface of sheet 1 of the light wave coming from the surface of three-dimensional object 2. This condition can be represented by the following equations.

$$B(x, y) = \sum_i Fr \left( Ai \left( \xi, \eta, \zeta \right) \right) \quad \ldots \ldots \ldots (1)$$

$$I = T \left| B(x, y) + R(x, y) \right|^2 \quad \ldots \ldots (2)$$

where $\xi, \eta, \zeta$ are coordinates indicating a three-dimensional object;

$x, y$ are coordinates on the light recording medium;

Ai is the amplitude of the light wave at the surface of the three-dimensional object (a complex quantity in rms value);

Fr is the symbol for the Fresnel transformation;

B is the amplitude of the light wave at the surface of the light recording medium (a complex quantity in rms value);

R is the amplitude of the wave of the reference light at the surface of the light recording medium (a complex quantity in rms value);

T is the exposure time; and

I is the light energy received by the light recording medium.

The above-mentioned "Fresnel transformation" is a term standing for the following calculation procedure. Namely, in determining the distribution, at a given plane, of light coming from the surface of an object; (1) firstly, the surface of the object is divided into minute areas; (2) then, distribution, at the given plane, of the light coming from an arbitrarily taken one of the minute areas is calculated; and (3) finally, the sum of all of the light distribution is determined by integration. This calculation procedure is called a Fresnel transformation because the light from the minute area propagates according to a rule called a Fresnel diffraction.

Output signal 7' of electronic computer 7 shown in FIG. 3 is represented by Ai ($\xi, \eta, \zeta$) of the above equation (1). The output signal 7' is processed through another electronic computer 7'' which may be identical to computer 7 in the function and which is operated to perform the calculation of the above equation (2). Thus, an output signal corresponding to I of equation (2) is obtained from electronic computer 7''. This output signal is recorded on recording medium 10. Effectuation of this recording involves great difficulty in that the record must be made in fineness comparable to the wavelength of the light. The only known measure usable for such a recording is the electron beam recording device 8. However, use of this device involves the following disadvantages. Namely, (1) the recording must be performed within a vacuum chamber 13; (2) recording of a large image is impossible; (3) it takes a long time to make a hologram, as it is produced through scanning with a small spot; (4) the produced record includes much noise because of its inherent poor ability for reproducing intermediate tints; and (5) the reproduction efficiency is as low as 30 % at most whereas the efficiency with an optical holographic recorder can be nearly 100 %. This last factor results from the fact that an electron beam can make a record only on the surface of the recording medium which generally has poor permeability for an electron beam; whereas in the optical recording, the hologram is written across the thickness of the recording medium such as the known photographic dry plate, the thickness of the sensitive emulsion being 10 to 100 microns which is far greater value in relation to the wavelength of light. Thus, a hologram having high reproduction efficiency cannot be made by an electron beam recorder.

The above disadvantages accompanying the computer holography are attributed fundamentally to the fact that only one characteristic factor of the incident light is modulated. This invention has removed the above disadvantages by providing a light spatial modulator with which two characteristic factors of the incident light are modulated.

Figure 5:
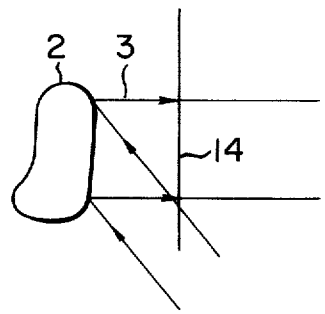
FIGS. 5 and 6 are schematic diagrams used for explaining the principle of this invention.

Referring to FIG. 4 which shows a computer hologram recorder utilizing the light spatial modulator of this invention, three-dimensional information represented by output signal 7' derived from electronic computer 7 is processed through another electronic computer 7'' (which may be identical to computer 7). This operation corresponds to the above equation (1), that is, to a Fresnel transformation. The operation in this case is different from the above-described operation with the conventional computer hologram recorder in the following point. Namely, in the conventional system, the amplitude and phase of the light wave at the surface of the recording medium were treated, whereas in the present case, the calculation is performed as regards the amplitude and phase of the light wave at an imaginary plane 14 positioned between three-dimensional object 2 and the recording medium (not shown), as illustrated in FIG. 5. The calculated values are complex numbers and represented by the following equation.

$$B'(\xi', \eta') = \left| B'(\xi', \eta') \right| \times \exp \left[ i\theta (\xi', \eta') \right]$$

(3)

where $\xi', \eta'$ are coordinates on the imaginary plane 14; B' is a distribution of the amplitudes of the light wave on the plane 14 (complex quantity in rms value); $\theta$ is argument of polar coordinate; and $i$ is the notation of imaginary number.

Figure 6:
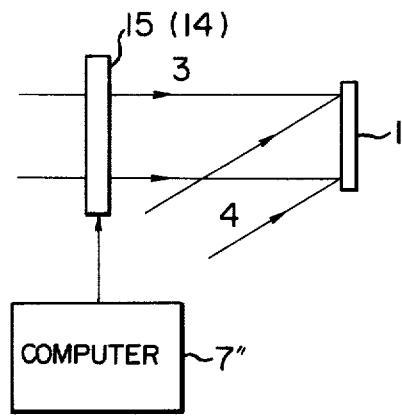

Thus, by placing a light spatial modulator 15 at the position of the plane 14 as shown in FIG. 6 and driving said modulator with electric signals representing the amplitude and the phase of the light wave which are determined by computer 7'' as described above, a two-dimensional distribution of the amplitude and phase of the light wave at plane 14 is obtained. In this case, it is essential that the light spatial modulator is capable of two-dimensionally modulating two factors of the light wave as the absolute value and the argument of a complex number. Though either of the characteristic factors of a light wave such as the amplitude, phase and the direction of polarization may be represented by the absolute value or the argument of a complex number, it is assumed in this particular case for explanation that the amplitude is represented by an absolute value and the phase by an argument. Then, by directing coherent light 3 from laser source 11 to light recording medium 10' through the light spatial modulator 15 and by superimposing reference light 4 on the projection of light 3 at the recording medium, an interference moire of two light waves, that is, a hologram is produced.

Figure 7:
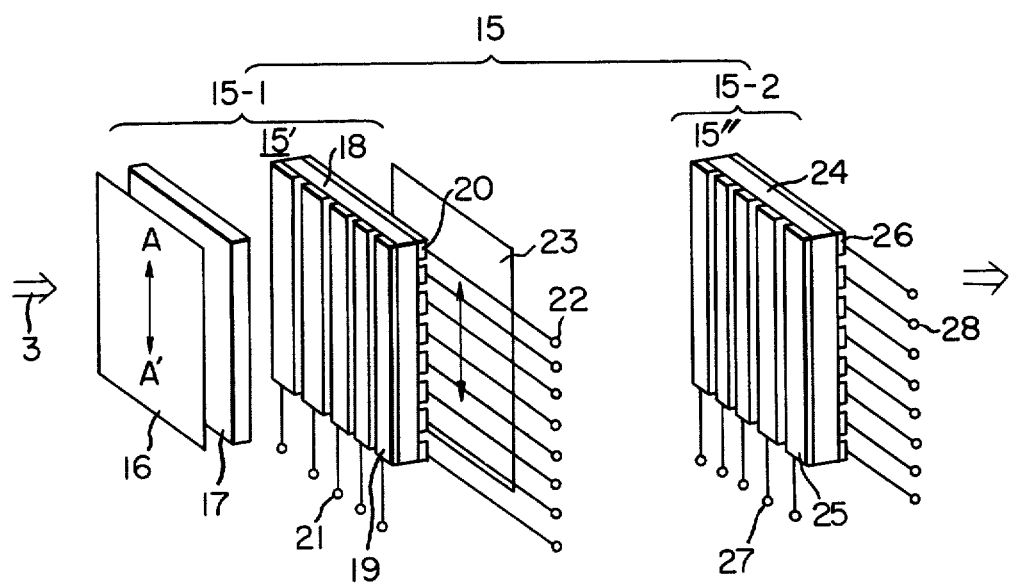
FIG. 7 is a schematic presentation of an embodiment of the complex modulator of this invention.

Referring to FIG. 7 which shows an embodiment of the light spatial modulator of the present invention and used in the system described above with reference to FIGS. 4 to 6, the light spatial modulator generally indicated by reference numeral 15 consists of part 15-1 which controls or modulates the amplitude of light wave and part 15-2 which controls the phase of light wave. These two parts are disposed tandem in relation to incident light 3. In amplitude controller 15-1, numeral 16 designates a known polarizer which linearly polarizes laser light passing therethrough, the direction of vibration of the light wave being unified into a vertical direction as indicated by arrows AA' in the Figure. Numeral 17 designates a quarter-wavelength plate which circularly polarizes light passing therethrough, the direction being clockwise or counter-clockwise. A matrix array 15' comprises a plate 18 of ferroelectric crystal such as gadolinium molybdate or lanthanum-containing lead titanate of which the direction of the polarization is changed (for example, reversed) by application of a voltage, a plurality of juxtaposed strips of transparent electrode 19 deposited on one surface of the crystal plate 18 with a terminal 21 attached to each strip of electrode, and another plurality of juxtaposed strips of transparent electrode 20 deposited on the opposite surface of the plate with a terminal 22 attached to each strip, the strips of the electrode on one surface being crosswise positioned in relation to those on the other surface. Detector 23 lets pass only vertically polarized light and interrupts laterally polarized light.

In the operation, an output signal from electronic computer 7" is applied across electrodes 19 and 20. Then, the polarization of the crystal in a small region at the crossing of two strip electrodes across which the electric signal is being applied, changes. In this particular embodiment, it is assumed that the "change" is a reversal of the polarization. If the thickness of the crystal plate is equal to a quarter-wavelength, polarization of the light transmitted through the polarization-reversed region is restored to the original vertical direction, while the light transmitted through the remaining region is polarized in the lateral direction. Therefore, only the former light is allowed to pass the detector 23 and thence the amplitude controller 15-1. Thus, the amplitude controller 15-1, as a whole, provides a pattern of two-dimensional variation of the amplitude of the light wave.

The light which has passed through the amplitude controller 15-1, proceeds to the phase controller 15-2. The latter comprises a matrix array 15" similar to the matrix array 15' of the amplitude controller, numeral 24 designating a plate of ferroelectric crystal such as gadolinium molybdate or Lanthanum-containing lead titanate, 25 and 26 transparent strip electrodes, 27 and 28 terminals attached to the electrodes. The output signal from electronic computer is applied to respective small regions of the crystal plate between opposed portions of the strip electrodes. Again, it is assumed that the change of polarization caused by the application of electric signal is the polarization reversal. Then, if the thickness of the crystal plate 24 is equal to a half-wavelength, for example, of the light, the phase of the light wave transmitted through a region of the reversed polarization is shifted by $\pi$ radians with respect to the phase of the light wave transmitted through the remaining region of the crystal plate. Therefore, the phase controller 15-2, as a whole, provides a pattern of two-dimensional variation of the phase of the light wave.

As the amplitude modulator 15-1 and the phase modulator 15-2 are independently fed with electric signals from the computer, the light transmitted through both modulators is controlled or modulated independently as regards the amplitude and the phase.

In the above explanation, it has been assumed that the light wave is modulated as regards the amplitude and the phase. However, it will be understood that the direction of polarization may be treated instead of the phase. The modulation of the direction of polarization is effected by omitting detector 23 of the amplitude modulator in the embodiment shown in FIG. 7. Namely, the light emerging from the matrix array 15' includes vertically polarized waves as well as laterally polarized waves. Therefore, a pattern indicating two-dimensional variation of the direction of polarization over the surface of the matrix array, is obtained. Thus, it will be seen that the complex light spatial modulator, as a whole, controls the direction of polarization and the phase of the light wave independently from each other. When such a complex light spatial modulator is used for preparing a hologram in a system as shown in FIG. 4, the result will be the same as that obtained by amplitude modulation, as only the component of the incident light that coincides with the reference laser light of the direction of polarization is effective for producing the hologram. An additional advantage in this case is that the detector 23 is dispensed with.

In the above description, it has been seen that the matrix arrays used in the light spatial modulator comprise a plate of ferroelectric crystal with a plurality of parallel strip electrodes disposed on opposite surfaces crosswise to each other and that two-dimensional variation of local polarization of the crystal is controlled by application of voltage across the opposite strip electrodes. However, matrix arrays used in connection with this invention are not limited to such a type as described above. An alternative form of the matrix array may comprises a composite plate consisting of a plate of ferroelectric crystal and a plate of photoconductive material, a layer of a transparent electrode being provided on each outer surface of the composite plate, and a constant voltage being applied across the thickness of the plate through the transparent electrodes. By projecting information-bearing light on to the plate, the voltage across the ferroelectric crystal will be modulated according to the intensity of the light, resulting in corresponding modulation of the polarization.

Figure 8:
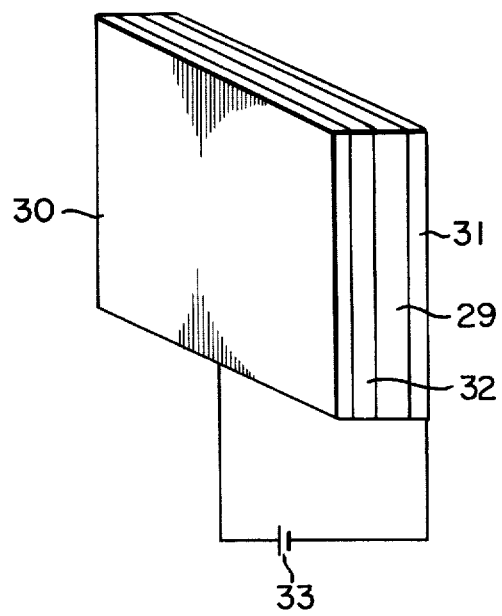
FIG. 8 is a diagram of an alternative form of a modulator usable in the complex modulator of this invention.

Referring to FIG. 8 which schematically shows the above-mentioned alternative form of matrix array, reference numeral 29 designates the above-mentioned plate of ferroelectric crystal, 30 and 31 transparent electrodes, 32 of the photoconductive plate positioned on the light input side of the crystal plate 29, and 33 a voltage source for supplying the constant voltage. In operation, the information-bearing light is projected on the transparent electrode 30. The resistance of the photoconductive plate at regions penetrated by the light beam is reduced according to the intensity of the light beam, and therefore, the voltage across the ferroelectric plate is accordingly increased at the corresponding regions. The variation of the voltage across the crystal plate changes the polarization of the crystal. Thus, the crystal plate has a distributed polarization in a pattern corresponding to the information carried by the light.

Therefore, each or one of the matrix arrays in the light spatial modulation shown in FIG. 7 can be substituted by the device shown in FIG. 8. In this case, three-dimensional information (for example, a picture image) is calculated according to the above-mentioned equation (3) by means of electronic computer 7" in the arrangement shown in FIG. 4, and light which bears the three-dimensional information (for example, laser light which has passed a transparency bearing said image) is directed to such a device as is shown in FIG. 8 to thereby change the local polarizations of the ferroelectric plate. Thus, the same effect as obtained by the direct modulation with output signal of computer 7'' is achieved. It will be noted that the device shown in FIG. 8 is by far simpler in the construction than the matrix array shown in FIG. 7.

As described above, by setting a virtual plane between a three-dimensional object and a light recording medium, calculating, by an electronic computer, the amplitude and phase which the light from the object would have at the virtual plane, and modulating the light according to the calculated results by means of the light spatial modulator of this invention placed at the position of the virtual plane, the three-dimensional information is easily recorded on the light recording medium using known holographic techniques. Thus, by use of the modulator of this invention, the previously-mentioned various disadvantages due to use of the conventional electron beam recording device can be eliminated.

I claim:

1. A complex light spatial modulator comprising: two modulator means for respectively modulating an incident light wave as regards one different factor taken from three factors of the light wave, that is, the amplitude, the phase and the direction of polarization according to given three-dimensional information;

each of said two modulator means including a plate of ferroelectric crystal with a plurality of parallel strips of transparent electrode provided on each surface of said ferroelectric plate, the direction of the strips on one surface being crosswise to those on the other surface, an electric signal representing said three-dimensional information being applied across said ferroelectric plate though said transparent electrodes, and said two modulator means being disposed in tandem with respect to the incident light.

2. A complex light spatial modulator comprising two modulator means for respectively modulating an incident light wave as regards one different factor taken from three factors of the light wave, that is, the amplitude, the phase and direction of polarization according to given three-dimensional information, said two modulator means being disposed in tandem with respect to the incident light, each of said two modulator means including a composite plate consisting of a layer of ferroelectric crystal and layer of photoconductive material, the latter layer being on the light input side, a planar transparent electrode provided on each surface of said composite plate, and means for applying a DC voltage across said composite plate through said electrodes.

3. A complex light spatial modulator comprising:
a first modulator adapted to be disposed in the path of light to be modulated, for producing a two-dimensional distribution of a selected first characteristic of the light incident thereon;
a second modulator adapted to be disposed in the path of the light modulated by said first modulator, for producing a two-dimensional distribution of a selected second characteristic, different from said first characteristic of the light incident thereon;
each of said first and second modulators including a ferroelectric crystal plate having a plurality of parallel strips of transparent electrodes provided on each surface of said plate, the direction of the strips on one surface of the plate being orthogonal to the direction of the strips on the opposite surface of the plate, an electric signal representative of modulation-imparting information being applied across said plate through said electrode, and one of said modulators further including a first polarizer having a prescribed direction of polarization disposed adjacent one side of said plate, and further including a quarter-waveplate disposed between said polarizer and said plate.

4. A complex light spatial modulator according to claim 3, wherein said one modulator further includes a second polarizer disposed adjacent the side of said plate opposite said one side thereof.

5. A complex light spatial modulator comprising:
a first modulator adapted to be disposed in the path of light to be modulated, for producing a two-dimensional distribution of a selected first characteristic of the light incident thereon;
a second modulator, adapted to be disposed in the path of the light modulated by said first modulator, for producing a two-dimensional distribution of a selected second characteristic, different from said first characteristic, of the light incident thereon;
each of said first and second modulators including a composite plate of a ferroelectric crystal plate and a plate of photoconductive material, a layer of transparent electrode material provided on opposite sides of said composite plate, means for applying a voltage across said composite plate through said electrodes, and means for modulating the resistance of said photoconductive material in accordance with information-bearing light projected thereon.

* * * * *